Dec. 1, 1964 R. C. SCHWARTZ 3,159,086
PLASTIC CYLINDER ASSEMBLY
Filed March 18, 1963 2 Sheets-Sheet 1
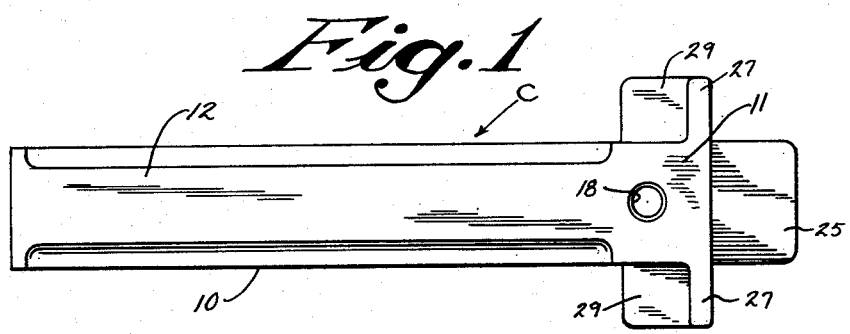
 
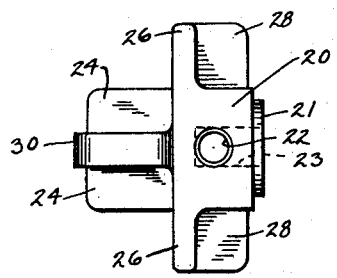 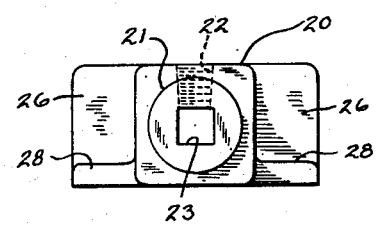
INVENTOR
ROY C. SCHWARTZ
BY *Wright Wright*
ATTORNEYS Dec. 1, 1964 R. C. SCHWARTZ 3,159,086
PLASTIC CYLINDER ASSEMBLY
Filed March 18, 1963 2 Sheets-Sheet 2
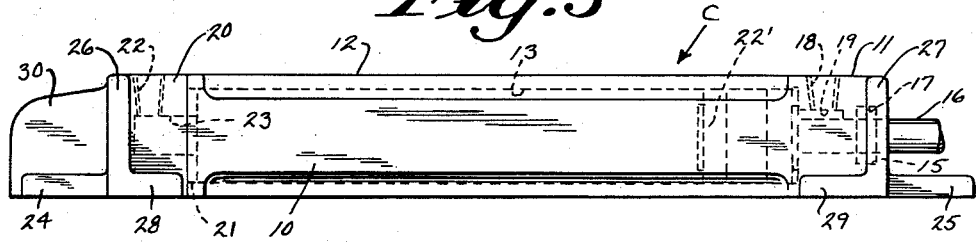
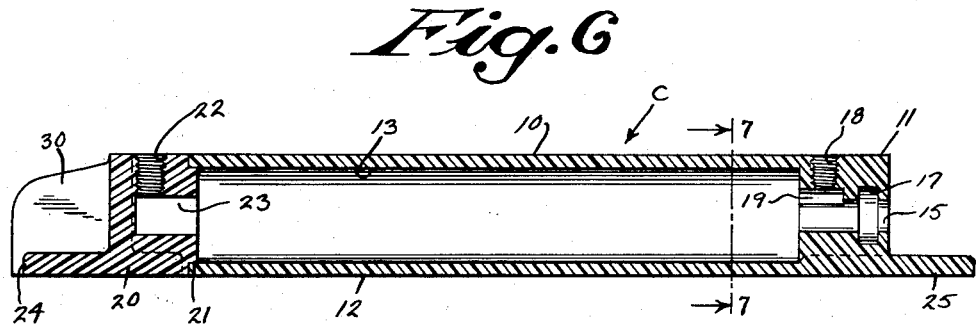
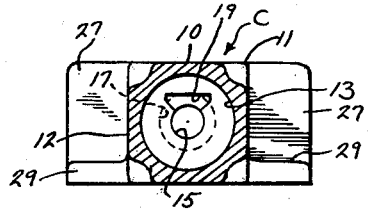
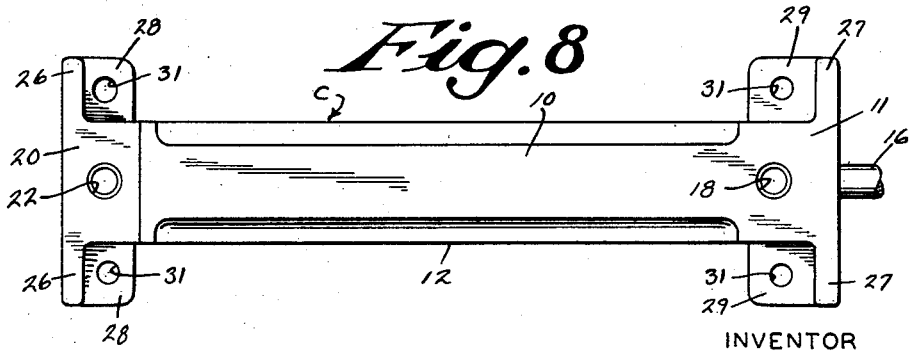
INVENTOR
ROY C. SCHWARTZ
BY *Wright Wright*
ATTORNEYS ; # United States Patent Office 3,159,086
Patented Dec. 1, 1964

3,159,086
PLASTIC CYLINDER ASSEMBLY
Roy C. Schwartz, Milwaukee, Wis., assignor to Galland-Henning Manufacturing Company, Milwaukee, Wis., a corporation of Wisconsin
Filed Mar. 18, 1963, Ser. No. 266,099
2 Claims. (Cl. 92—161)

This invention appertains to machine elements and more particularly to cylinders of the type used in handling air or other fluid for actuating pistons for operating machine parts.

Such cylinders usually embody a metal barrel, end heads, sealing gaskets and bolts for connecting the end heads tight against the barrel terminals to prevent leakage. Various types of brackets are secured to the cylinders for connecting the cylinders in a desired place and position on a machine or other device to be operated. These cylinders require careful machining and the assembling of the various parts thereof results in a costly structure.

It is one of the primary objects of this invention to provide a cylinder assembly in which all bolts, extraneous mounting brackets and the like, are eliminated, whereby to produce an exceptionally simple form of cylinder.

Another salient object of the invention is to provide a cylinder and piston assembly in which the cylinder is molded from a desired type of thermoplastic material with the end head or heads sealed to the barrel to form a homogeneous whole, whereby to prevent leakage and machining of parts and thus producing an exceptionally economical structure which can be discarded and thrown away when wear has taken place between the cylinder and piston.

Another prime object of the invention is to mold directly on the barrel or its heads, a series of angularly related mounting lips or flanges so that the user of the assembly can select any of such lips or flanges for mounting, according to the position of the cylinder on a device, the remaining lips or flanges being cut off, if such remaining lips or flanges interfere with the desired mounting.

A still further object of the invention is to provide a one-piece plastic cylinder with the piston sealed therein, and of such a low cost that the entire assembly can be thrown away and replaced by a new assembly thereby eliminating the work and cost of refinishing and replacing worn metal cylinders and pistons.

With these and other objects in view, the invention consists in the novel construction, arrangement and formation of parts as will be hereinafter more specifically described and claimed, and illustrated in the accompanying drawings, in which drawings, FIGURE 1 is a top plan view showing the integral plastic molded cylinder and one head;

FIGURE 2 is a top plan view showing the plastic molded head for connection with the barrel;

FIGURE 3 is an inner end elevational view of the molded plastic cylinder head;

FIGURE 4 is a top plan view showing the completed cylinder and piston assembly with the head shown in FIGURES 2 and 3, sealed to the barrel to provide the integral, homogeneous cylinder whole;

FIGURE 5 is a side elevational view of the complete cylinder and piston assembly;

FIGURE 6 is a longitudinal sectional view through the cylinder, the showing of the piston being eliminated in this view for clearance;

FIGURE 7 is a transverse sectional view through the cylinder taken on the line 7—7 of FIGURE 6, looking in the direction of the arrows, and FIGURE 8 is a view similar to FIGURE 4, but showing certain of the mounting lips or flanges cut away, and the assembly ready for mounting in a selected position on a device.

Referring to the drawings in detail, wherein similar reference characters designate corresponding parts throughout the several views, the letter C generally indicates the novel cylinder assembly and the same includes a barrel 10 having integrally molded thereon an end head 11. The barrel 10 and head 11 are molded from a desired type of thermoplastic material, such as polypropylene.

The barrel 10 includes an elongated body 12 preferably of a square shape and having molded therein the cylindrical piston chamber 13. As stated, the head 11 is molded directly on one end of the barrel and this head has formed axially therein a bore 15 for slidably receiving a piston rod 16. This bore 15 intermediate its ends can be provided with an annular groove 17 for the reception of a sealing gasket or O-ring for intimate contact with the piston rod 16. The head also has formed therein an internally threaded port 18 in which can be threaded a feed and return pipe for fluid. This port communicates with a longitudinally extending way 19 which opens into the barrel. The barrel 10 and its head 11, are best shown in FIGURE 1.

Molded as a separate part from thermoplastic materials, is an end head 20 and this head is best shown in FIGURES 2 and 3. The head 20 is to be connected to the barrel 10 at the end thereof opposite to the integral head 11. The head 20 is formed from the same type of plastic material as the barrel 10 or a plastic material, which is compatible with the barrel, in that, the head 20 is integrally connected to the barrel by sealing or fusing to form the homogeneous whole. The head 20 is of a size and shape to fit snug against the open terminal of the barrel and molded on the inner end of the head 20 is an annular shoulder 21 which fits directly into the barrel. This is best shown in FIGURE 6. With the head 20 placed on the end of the barrel, the barrel and head are now fused together to form an integral unit. Obviously, before the welding of the head 20 to the barrel and piston assembly 22′ (shown in dotted lines in FIG. 5), and its rod 16 are placed into the barrel, after which the head 20 is sealed in place. The head 20 also has molded therein a port 22 which can be internally threaded for the reception of a fitting or feed and return pipe, not shown. This port 22 communicates with a passageway 23 leading into the barrel.

Particular attention is now directed to the end heads 11 and 20 and these heads have formed thereon and molded directly thereto a series of angularly related mounting lips or flanges. Thus, each head has molded thereon at its outer face and adjacent to the lower surface of the barrel outwardly projecting lips indicated respectively by the numerals 24 and 25. Projecting laterally from the opposite sides of the heads are mounting flanges or lips 26 and 27. Molded integral with the flanges or lips 26 and with the heads are bottom mounting flanges 28 and 29. The end head 20 also has formed thereon a central lip or flange 30 which rises from the bottom lip or flange 24.

The user of the cylinder selects the flanges or lips that are best suited for a particular mounting on a device and the flanges or lips not being used can be cut off or sawed away. Hence, in FIGURE 8, I have shown flanges 24, 25 and 30 cut away. The lateral flanges 28 and 29 which are to be used can be drilled to provide the desired mounting openings 31. The mounting flange 30 is particularly useful where the cylinder is to be immediately mounted and this flange is, of course, drilled to provide the bearing opening.

As the particular type of plastic used provides a smooth, slippery surface, the machining of the cylinder chamber 13 and other parts is entirely eliminated.

Great stress is laid on the fact that an economical cylinder assembly is provided in which all parts are integrally connected to form a unitized structure. Thus, the piston is sealed directly within the cylinder and there are no heads to be connected to the barrel by screws or bolts. This eliminates leakage between barrel and heads and also produces a streamlined, clean appearing cylinder assembly.

From the foregoing description, it can be seen that I have provided a complete, integral cylinder formed economically from a thermoplastic material. As heretofore brought out, the cost of the entire cylinder is such that the same can be thrown or cast away when worn or mutilated.

Changes in details may be made without departing from the spirit or the scope of this invention, but what I claim as new is:

1. A cylinder assembly formed from a thermoplastic material comprising a premolded barrel and cylinder head, said barrel having molded therein a piston receiving bore, and a second premolded cylinder head formed from a material compatible with the barrel and sealed and fused to said barrel to seal said bore, and a plurality of angularly related mounting flanges molded on both of said heads, whereby said flanges can be selected for a particularly cylinder mounting with remaining flanges being adapted to be cut away.

2. A cylinder assembly molded from a thermoplastic material comprising a premolded barrel and cylinder head, said head having a piston rod receiving bore molded therein, said barrel being of a square shape in cross-section, and having a piston receiving bore molded therein, a second premolded cylinder head formed of a plastic compatible with the barrel and sealed and fused to said barrel to seal said bore and to form an integral one-piece unit, each of said heads having, an outwardly projecting horizontally positioned mounting flange, a pair of laterally projecting horizontally positioned mounting flanges and a pair of vertically positioned laterally extending mounting flanges, and said second head having a vertically positioned longitudinally extending mounting flange, whereby said cylinder assembly can be suited to different mounting situations and whereby certain flanges may be cut and trimmed off.

References Cited in the file of this patent

UNITED STATES PATENTS

| | | |
|---|---|---|
| 730,695 | Pivert | June 9, 1903 |
| 2,693,186 | Riker et al. | Nov. 2, 1954 |
| 2,838,300 | Gray | June 10, 1958 |
| 2,922,380 | Pedlow et al. | Jan. 26, 1960 |
| 2,987,046 | Atherton | June 6, 1961 |
| 3,006,282 | Sisson | Oct. 31, 1961 |
| 3,040,712 | Harrah | June 26, 1962 |